United States Patent [19]
Yoshizawa

[11] Patent Number: 5,225,317
[45] Date of Patent: Jul. 6, 1993

[54] OPTICAL INFORMATION RECORDING MEDIUM

[75] Inventor: Atsushi Yoshizawa, Saitama, Japan

[73] Assignee: Pioneer Electronic Corporation, Tokyo, Japan

[21] Appl. No.: 914,632

[22] Filed: Jul. 17, 1992

Related U.S. Application Data

[63] Continuation of Ser. No. 561,067, Aug. 1, 1990, abandoned.

[30] Foreign Application Priority Data

Oct. 31, 1989 [JP] Japan ................................. 1-284094

[51] Int. Cl.$^5$ .......................... G11B 7/24; G03C 1/73
[52] U.S. Cl. ................................ 430/270; 430/495; 430/945; 346/135.1
[58] Field of Search ................... 430/270, 495, 945; 346/135.1

[56] References Cited

U.S. PATENT DOCUMENTS 4,977,064 12/1990 Sukawa et al. ................ 430/495
5,001,035 3/1991 van Liempd et al. .......... 430/495

Primary Examiner—Marion E. McCamish
Assistant Examiner—Kathleen Duda
Attorney, Agent, or Firm—Keck, Mahin & Cate

[57] ABSTRACT

An optical information recording medium comprises resin-recording layers respectively made of polymers each carrying a dye. The layers are laminated on a substrate in such a manner that the first and second layer in the resin-recording layers directly adjoin each other. The first polymer constructing the first layer has a solubility to be insoluble to the second solvent capable of dissolving the second polymer constructing the second layer. The second polymer has a solubility to be insoluble to a first solvent capable of dissolving the first polymer.

8 Claims, 1 Drawing Sheet

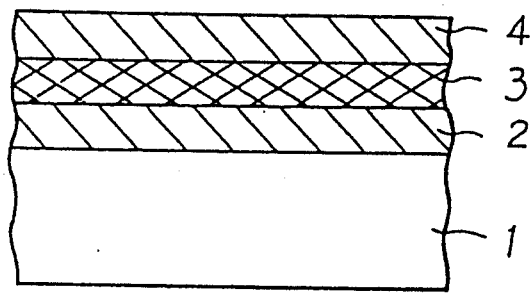

OPTICAL INFORMATION RECORDING MEDIUM

This is a Continuation of application Ser. No. 07/561,067, filed Aug. 1, 1990 now abandoned

BACKGROUND OF THE INVENTION

1. Field of the Invention

The present invention concerns an optical information recording medium used in optical recording and reproducing apparatus and, more in particular, it relates to an optical disk in which information is written by irradiation of a laser beam and the written information is read also by using the laser beam.

2. Description of the Prior Art

In such an optical information recording medium technique, there is known an optical recording and reproducing system using a method of recording and reproducing information such as video images or voices. Also known is an optical disk of Direct Read After Write (DRAW) type or Write Once type which has a single recording layer, for example, made of a material sensitive to a laser beam and capable of forming pits by sublimation due to absorbing the irradiated laser beam. One type of conventional DRAW optical disks has such a structure that a single dye-recording layer made of photosensitive material such as an organic dye and formed on a transparent substrate.

It has been found difficult to obtain an optical disk comprising a dye-recording layer having satisfactory photosensitive characteristics for a laser beam of a predetermined wavelength only by using a single photosensitive material. It is therefore considered to form a dye-recording layer by mixing two or more photosensitive materials. However, when a dye-recording layer is formed to contain two or more photosensitive materials, it is necessary to prepare a solution including a specific solvent with which two or more kinds of photosensitive materials is compatible, and the solution has to be spin-coated. In addition, it is also necessary to take into consideration such a condition that the solvent does not adversely effect on the substrate, i.e. dissolution, swelling etc. Thus, there is a problem that a severe restriction is present for the combination between the photosensitive material and the solvent, as well as that the degree of freedom for the selection of the photosensitive material is narrowed.

For overcoming such restriction, there has been proposed to laminate on a substrate a plurality of thin dye-recording layers each having a different molecular skeleton (Japanese Patent Application Laid-Open Sho 60-147391; hereinafter referred to as the prior art 1). There has been also proposed to laminate on a substrate a plurality of thin dye layers respectively including the same dyes each having an identical molecular skeleton (Japanese Patent Application Laid-Open Sho 63-252791; hereinafter referred to as the prior art 2).

However, the prior art 1 utilizes that a solubility of dye to a solvent is different from that of another dye. Specifically, a first solution of dye is prepared by dissolving a dye A in a solvent a in which the dye A is soluble to the solvent a but insoluble to another solvent b. This first solution is coated on a transparent substrate and makes a dye layer A by drying. Next a second solution prepared by dissolving a dye B in a solvent b in which the dye B is insoluble to the solvent a but soluble to the solvent b is coated on the dye layer A, thereby forming the laminated thin layers of the dyes A/B on the substrate. Accordingly, this lamination technique involves a problem that when two dyes included in the neighbor laminated layers have a similar solubility to a solvent these dyes can not be laminated.

On the other hand, the prior art 2 discloses an information recording medium in which two information recording medium units of an azuleniun type dye are appended to each other. This technique merely proposes to append two information recording medium units, since there is no effective method for preventing the leaching of dyes from the units upon lamination coating process. It involves a problem that the manufacturing steps are complicated to deteriorate the productivity and increase the manufacturing cost.

SUMMARY OF THE INVENTION

An object of the present invention is to provide an inexpensive optical information recording medium having a recording layers including dyes with good production efficiency, even when dyes having similar molecular skeletons and similar solubilities to a solvent are used.

The optical information recording medium according to the present invention comprises a substrate and a plurality of resin-recording layers respectively made of polymers each carrying a dye and laminated on said substrate in such a manner that the first and second layers in said resin-recording layers directly adjoin each other, wherein the first polymer making up the first layer is insoluble second solvent capable of dissolving the second polymer making up the second layer, and where the second polymer is insoluble in the first solvent which is capable of dissolving the first polymer.

According to the present invention, such an anxiety is canceled that a dye included in a resin-recording layer leaches into next layer, since resin-recording layers are made of the cured polymers carrying dyes and are laminated as thin multi-layers. In the manufacturing process, a plurality of dyes are dispersed respectively in a plurality of uncured polymers each having different solubility to a solvent. Accordingly, even if dyes have similar solubilities to a solvent, any dyes are not leached out of the previously formed resin-recording layer carrying another dye in the subsequent coating processes, since every dye is fixed in the cured polymer upon laminating the coating layer. That is, it is necessary that the solubilities of the polymers in the adjacent layers are different from each other. Accordingly, it is possible to improve the productivity of the optical DRAW disk and to reduce the manufacturing cost thereof.

BRIEF DESCRIPTION OF THE DRAWINGS

The drawing shows a cross sectional view of a portion of an optical information recording medium according to the present invention.

DETAILED DESCRIPTION OF A PREFERRED EMBODIMENT

The present invention will be explained by way of its preferred embodiment with reference to the drawing.

The drawing is a cross sectional view of an optical information recording medium according to the present invention. A transparent substrate 1 is made of material of excellent light permeability or reflectivity such as glass, acrylic resin, vinylic resin, polyether resin, epoxy resin, polycarbonate resin, polybutyral resin, cellulose acetate butyrate resin and nitrocellulose resin.

A first resin-recording layer 2 is a thin resin film made of synthetic resin and formed through a spin coating process on the substrate 1. The first resin-recording layer 2 contains a dye for absorbing an irradiated laser beam with a specific wavelength and/or power.

A second resin-recording layer 3 is another thin resin film made of another synthetic resin and formed through a spin coating process on the first resin-recording layer 2. The second resin-recording layer 3 contains another dye for absorbing a laser beam with another wavelength and/or power. In this way, the first and second resin-recording layers 2, 3 have respectively different properties of reaction with the irradiated lights having optical energy and/or wavelength from each other.

A third resin-recording layer 4 is a thin resin film layer made of further another synthetic resin and formed on the second resin-recording layer 3 and containing an identical dye to that of the resin-recording layer 2. The third resin-recording layer 4 may carry a dye having a characteristic of absorptivity different from that of the resin-recording layer 2.

Such a plurality of resin-recording layers 2, 3 and 4 are successively laminated on the substrate 1. That is, this optical information recording medium according to the present invention is manufactured through the following steps:

A first solution is prepared by dispersing or dissolving a first dye in a methanol solution of polyvinyl alcohol, for example. The resin of polyvinyl alcohol is soluble to methanol but insoluble to acetone. The first solution thus is spin-coated on the substrate 1. The first solution coated on the substrate 1 is dried by evaporating methanol to cure polyvinyl alcohol to a solid polymer. A first resin-recording layer is formed of the resin of polyvinyl alcohol on the substrate 1.

Subsequently, a second solution is prepared by dispersing or dissolving a second dye in an acetone solution of polyvinyl chloride, for example. The resin of polyvinyl chloride is soluble to acetone but insoluble to methanol. The resin of polyvinyl chloride has a dissolution property different from that of polyvinyl alcohol in the first resin-recording layer 2. The second solution then is spin-coated on the first resin-recording layer 2. The second solution coated on the first resin-recording layer 2 is dried by evaporating acetone to cure polyvinyl chloride to another solid polymer. A second resin-recording layer 3 thus is formed of the resin of polyvinyl chloride on the first resin-recording layer 2.

Then, a third resin-recording layer 4 is formed of the same resin of the first resin-recording layer 2 and by the same method as that for the proceeding layers.

In this way, it is possible to laminate these resin-recording layers by means of a spin-coating process. It is preferable that the first, second and third resin-recording layers 2, 3, 4 does not affect an adverse influence in leaching of dyes to each other, since these resin-recording layers adjoining each other are formed of polymers having different solubilities into a common solvent respectively. The neighboring resin-recording layers containing such dyes can be laminated to each other as thin resin-films, even if dyes to be neighbored have a similar solubility soluble to both of methanol and acetone as the dyes have a similar molecular structure. This is a reason that these dyes are fixed into the resin-polymers constructing the neighboring resin-recording layers respectively.

There are the following typical preferable examples I-III of combination of the first and second layers formed of polymers in the optical information recording medium according to the present invention. The solvents shown in the parenthesis are used in the lamination process. The polymer of the first layer is insoluble to the solvent of the second layer adjoining the first layer in each combination. The polymer of the second layer is insoluble to the solvent of the first layer adjoining the first layer in each combination.

| | polymer | (solvent) |
|---|---|---|
| | Combination I | |
| First layer: | polyurethane | (acetone) |
| Second layer: | nitrocellulose, methyl polymethacrylate, or polyvinyl acetate | (diacetone alcohol) |
| | Combination II | |
| First layer: | polyvinyl alcohol, or polyvinyl acetate | (methanol) |
| Second layer: | methyl polymethacrylate, polyvinyl chloride, polycarbonate, polystyrene, or nitrocellulose | (acetone) |
| | Combination III | |
| First layer: | polystyrenic elastomer | (cyclohexanone) |
| Second layer: | polyvinyl alcohol, or polyvinyl acetate | (ethyl cellosolve) |

A preferred photosensitive characteristics to a laser beam of a predetermined wave-length can be obtained by successively laminating these first and second resin-recording layers in the optical disk.

Appropriate dyes may be selected while taking their compatibility with the polymer solution into consideration. After selecting an IR-ray and UV-ray absorbing dye for the first resin-recording layer and by selecting a near IR-ray absorbing dye for the second resin-recording layer, these resin-recording layers successively laminated and alternatively laminated. The near IR-ray absorbing material may be sandwiched between the IR-ray and UV-ray absorbing materials. When such a lamination of resin-recording layers is irradiated by a laser beam, the laser beam penetrates in turn the resin-recording layers from top to bottom. Shapes of pits penetrated in resin-recording layers by sublimation thereof are complimentary to each other, namely each pit is opened at the recording layer according to the total depth of the resin-recording layers by different wavelength components included in the irradiated laser beam. A specific resin-recording layer is opened by a specific wavelength component in the irradiated laser beam. As a result, since the internal side surface of the pit is possibly formed smooth, the shape at the boundary between the pit and non-pit is clarified and entirely free from undesirable effects by the noise wavelength components of laser beam used. Such a lamination of resin-recording layers can be prevented from causing noises upon reproduction of information.

The dyes colored by UV-rays and then discolored by visible rays or near IR-rays may be used for the first and second resin-recording layers. The reason is that both of the first and second resin-recording layers are transparent in a non-recorded state and, when they are colored by writing, these layers are of excellent safety. In this case, various light sources can be used upon reading, as well as individual spectral changes are increased to obtain a good S/N ratio.

As has been described above according to the present invention, it is possible to laminate photosensitive materials containing dyes of similar structures or solubilities into thin films, which such dyes could not conventionally be laminated so far because the dyes are leached upon subsequent coating due to the similar solubility to the solvent. Accordingly, the degree of freedom for the selection of the photosensitive materials is increased. The restriction on the combination of the photosensitive materials and the solvents can be reduced significantly in the resin-recording layer.

In addition, since dyes having appropriate light absorbing characteristics can be selected optionally, it is possible to obtain a resin-recording layer by an appropriate combination of dyes, which is free from undesirable effects by the noises of wavelength components in laser beam. Further, the total of the resin-recording layers has a sharp overall absorption characteristics to a predetermined wavelength. Since it is possible to constitute the first and second photosensitive materials such that light absorption spectrum after coloration does not overlap with each other multi-recording can easily be conducted due to the multi-layered structure. It is possible to obtain an optical information recording medium of high density having a recording capacity with the density twice as much as that in the conventional optical information recording medium.

Furthermore, since materials having various resistance such as UV-ray resistance, IR-ray resistance, water resistance, solvent resistance and weather resistance can be used in combination as polymers containing dyes, it is possible to improve the overall performance by the complimentary effect of such materials. That is, it can provide an effect capable of obtaining an optical information recording medium with less degradation to external optical rays after the recording step.

What is claimed is:

1. An optical information recording medium comprising a substrate and a plurality of resin-recording layers containing polymers each carrying a dye and laminated on said substrate in such a manner that a first layer and a second layer in said resin-recording layers directly adjoin each other, wherein a first solution of a first uncured polymer in a first solvent, said first solution further including a first dye dissolved or dispersed therein, is contained in said first layer, and wherein said first polymer is insoluble in a second solvent capable of dissolving a second polymer contained in said second layer, and a second solution of a second uncured polymer in a second solvent, said second solution further including a second dye dissolved or dispersed therein, is contained in said second layer, and wherein said second polymer is insoluble in said first solvent capable of dissolving said first polymer contained in said first layer.

2. An optical information recording medium according to claim 1, wherein said first polymer is polyurethane and said first solvent is acetone, and said second polymer is a resin selected from the group consisting of nitrocellulose, methyl polymethacrylate and polyvinyl acetate and said second solvent is diacetone alcohol.

3. An optical information recording medium according to claim 1, wherein said first polymer is a resin is selected from the group consisting of polyvinyl alcohol and polyvinyl acetate and said first solvent is methanol, and said second polymer is a resin selected from the group consisting of methyl polymethacrylate, polyvinyl chloride, polycarbonate, polystyrene and nitrocellulose and said second solvent is acetone.

4. An optical information recording medium according to claim 1, wherein said first polymer is polystyrenic elastomer and said first solvent is cyclohexanone, and said second polymer is a resin is selected from the group consisting of polyvinyl alcohol and polyvinyl acetate and said second solvent is ethyl cellosolve.

5. A method for manufacturing an optical information recording medium including a substrate and a plurality of resin-recording layers respectively made of polymers each carrying a dye and laminated on said substrate in such a manner that the first and second layers in said resin-recording layers directly adjoin each other, which comprises the steps of:

preparing a first solution of a first uncured polymer in a first solvent, said first solution further including a first dye dissolved or dispersed therein;

preparing a second solution of a second uncured polymer in a second solvent, said second solution further including a second dye dissolved or dispersed therein, said first polymer being insoluble in said first solvent;

coating a substrate with said first solution;

drying and curing said first solution by evaporating said first solvent to form a first resin-recording layer;

coating said first resin-recording layer with said second solution; and drying and curing said second solution by evaporating said second solvent to form a second resin-recording layer.

6. A method according to claim 5, wherein said first polymer is polyurethane and said first solvent is acetone, and said second polymer is a resin selected from the group consisting of nitrocellulose, methyl polymethacrylate and polyvinyl acetate and said second solvent is diacetone alcohol.

7. A method according to claim 5, wherein said first polymer is a resin selected from the group consisting of polyvinyl alcohol and polyvinyl acetate and said first solvent is methanol, and said second polymer is a resin selected from the group consisting of methyl polymethacrylate, polyvinyl chloride, polycarbonate, polystyrene and nitrocellulose and said second solvent is acetone.

8. A method according to claim 5, wherein said first polymer is polystyrenic elastomer and said first solvent is cyclohexanone, and said second polymer is a resin selected from the group consisting of polyvinyl alcohol and polyvinyl acetate and said second solvent is ethyl cellosolve.

* * * * *